(12) United States Patent
Adrian et al.

(10) Patent No.: US 9,183,168 B2
(45) Date of Patent: Nov. 10, 2015

(54) DUAL MODE USB AND SERIAL CONSOLE PORT

(71) Applicant: Dell Products, LP, Round Rock, TX (US)

(72) Inventors: Jason D. Adrian, Cedar Park, TX (US); Kevin W. Mundt, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 336 days.

(21) Appl. No.: 13/774,713

(22) Filed: Feb. 22, 2013

(65) Prior Publication Data

US 2014/0244869 A1 Aug. 28, 2014

(51) Int. Cl.
*G06F 13/38* (2006.01)

(52) U.S. Cl.
CPC .................................... *G06F 13/385* (2013.01)

(58) Field of Classification Search
CPC ..................................................... G06F 13/385
USPC .................................................. 710/106, 315
See application file for complete search history.

(56) References Cited

U.S. PATENT DOCUMENTS

| | | | |
|---|---|---|---|
| 6,040,981 A | 3/2000 | Schmitt et al. | |
| 7,127,538 B1 * | 10/2006 | Nekl | 710/106 |
| 7,996,577 B2 | 8/2011 | Schmidt et al. | |
| 2005/0262285 A1 * | 11/2005 | Kang | 710/315 |
| 2008/0278905 A1 | 11/2008 | Artman et al. | |
| 2009/0059513 A1 | 3/2009 | Hood, III et al. | |
| 2009/0265045 A1 | 10/2009 | Coxe, III | |
| 2011/0012547 A1 | 1/2011 | Sultenfuss et al. | |
| 2012/0209447 A1 * | 8/2012 | Hortig et al. | 700/298 |

FOREIGN PATENT DOCUMENTS

CN 102779107 A * 11/2012

OTHER PUBLICATIONS

"DS_UT232R-200(500) USB to RS232 Adapter Cable" Data Sheet; Future Technology Devices International Limited; Document Reference No. FT_000341; Oct. 29, 2010.*

* cited by examiner

*Primary Examiner* — Glenn A Auve
(74) *Attorney, Agent, or Firm* — Larson Newman, LLP

(57) ABSTRACT

An information handling system includes a service connector operable to receive an RS-232 signal and a USB signal. The service connector is a USB type connector. The information handling system also includes a voltage converter operable to convert the RS-232 signal from a first voltage level to a first serial signal at a second voltage level when a signal received by the service connector is the RS-232 signal, a protocol converter operable to convert the USB signal to a second serial signal at the second voltage level when the signal received by the service connector is the USB signal, and a UART operable to receive the first serial signal and the second serial signal.

20 Claims, 7 Drawing Sheets

DUAL MODE USB AND SERIAL CONSOLE PORT

FIELD OF THE DISCLOSURE

This disclosure relates generally to information handling systems, and more particularly to accessing a management controller using multiple protocols without conflict.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems. In an enterprise computing environment, a management system can be connected to a server, a network appliance, a storage system, or other elements of the enterprise computing environment. The management system provides a system administrator with an ability to configure the elements of the enterprise computing environment.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
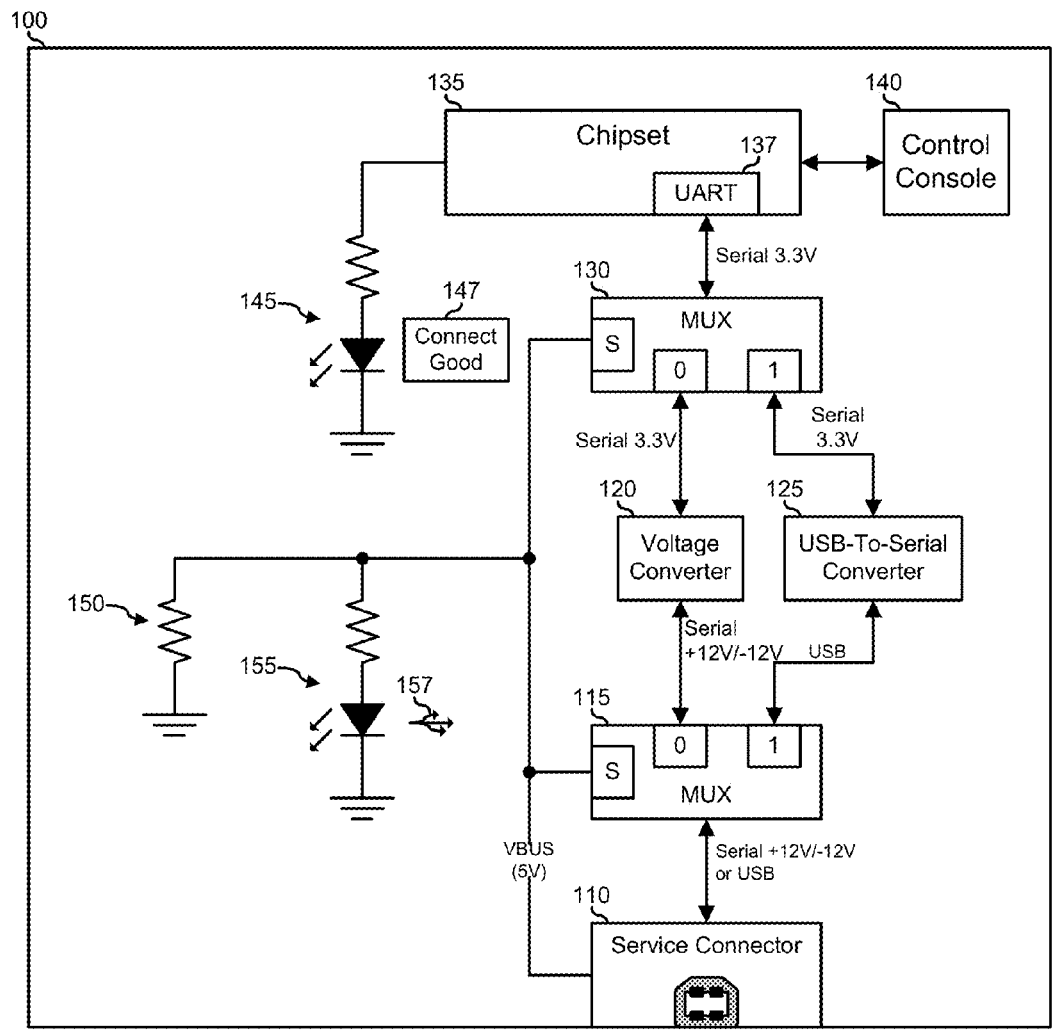
FIG. 1 is a block diagram illustrating an information handling system according to an embodiment of the present disclosure.
Figure 1:
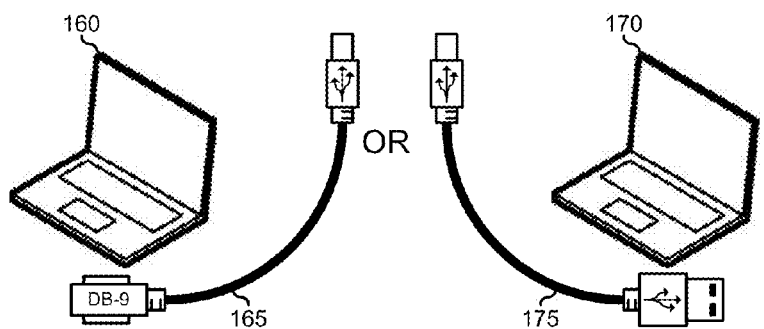

FIG. 1 illustrates an embodiment of a managed information handling system 100. For purpose of this disclosure an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Managed information handling system 100 includes a service connector 110, multiplexers 115 and 130, a voltage converter 120, a USB-to-Serial protocol converter 125, a chipset component 135, a control console module 140, indicators 145 and 155, and a pull-up resistor 150. Service connector 110 is a serial communication connector. In a particular embodiment, service connector 110 represents a Universal Serial Bus (USB) connector such as a Type-A connector, a Type-B connector, a Mini-A connector, a Mini-B connector, or another USB connector, as needed or desired. The serial communication connections of service connector 110 are connected to a de-multiplexed port of multiplexer 115, and a VBUS (5V) connection is connected to selector inputs of multiplexers 115 and 130, to pull-up resistor 150, and to indicator 155. A first multiplexed port (port 0) of multiplexer 115 is connected to a high voltage level port of voltage converter 120, and a low voltage level port of the voltage converter is connected to a first multiplexed port (port 0) of multiplexer 130. A second multiplexed port (port 1) of multiplexer 115 is connected to a USB signal port of USB-to-Serial protocol converter 125, and a serial signal port of the USB-to-Serial protocol converter is connected to a second multiplexed port (port 1) of multiplexer 130. Chipset component 135 includes a universal asynchronous receiver/transmitter (UART) 137 that is connected to a de-multiplexed port of multiplexer 130 and operates to translate serial data received from the multiplexer to parallel data, and vice versa. Chipset component 135 is connected to control console module 140 and to indicator 145.

Control console module 140 operates to provide an interface whereby a system administrator can configure information handling system 100. For example, a system administrator can connect a management system 160 or 170 to service connector 110 with a service cable 165 or 175, and can access control console module 140 to access a command line interface whereby the system administrator can set operating conditions within information handling system 100, such as basic input/output system (BIOS) settings, firmware settings, other operating conditions, or the like. Control console module 140 is illustrated as being connected to chipset component 135, but this is not necessarily so, and the control console module can be implemented as a part of the BIOS, a system management suite, or other hardware or code on information handling system 100, as needed or desired.

As such, management systems 160 and 170 include system management programs that permit the management systems to communicate with control console module 140 via serial communication links. Management system 160 operates to communicate with control console module 140 using an RS-232 serial communication protocol (i.e., a +12V/−12V serial data signal) via a DB-9 connector, and so service cable 165 includes a DB-9 connector for connecting to the management system and a USB type connector for connecting to service connector 110. Management system 170 operates to communicate with control console module 140 using a USB communication protocol via a USB connector, and so service cable 175 includes a USB type connector for connecting to the management system and another USB type connector for connecting to service connector 110. In a particular embodiment, service cable 175 includes a USB Type-A connector for connecting to management system 170, and a USB Mini-B connector for connecting to service connector 110. Note that, although service connector 110 is a USB type connector, the service connector does not provide a standard USB port functionality to information handling system 100. Rather, service connector 110 operates to provide a physical USB connection for translating RS-232 serial communications from management system 160 to a 3.3V serial communications protocol to UART 137, and to translate USB communications from management system 170 into the 3.3V serial communications protocol to the UART. The detailed operation of information handling system 100 is described in FIGS. 2 and 3, below.

Figure 2:
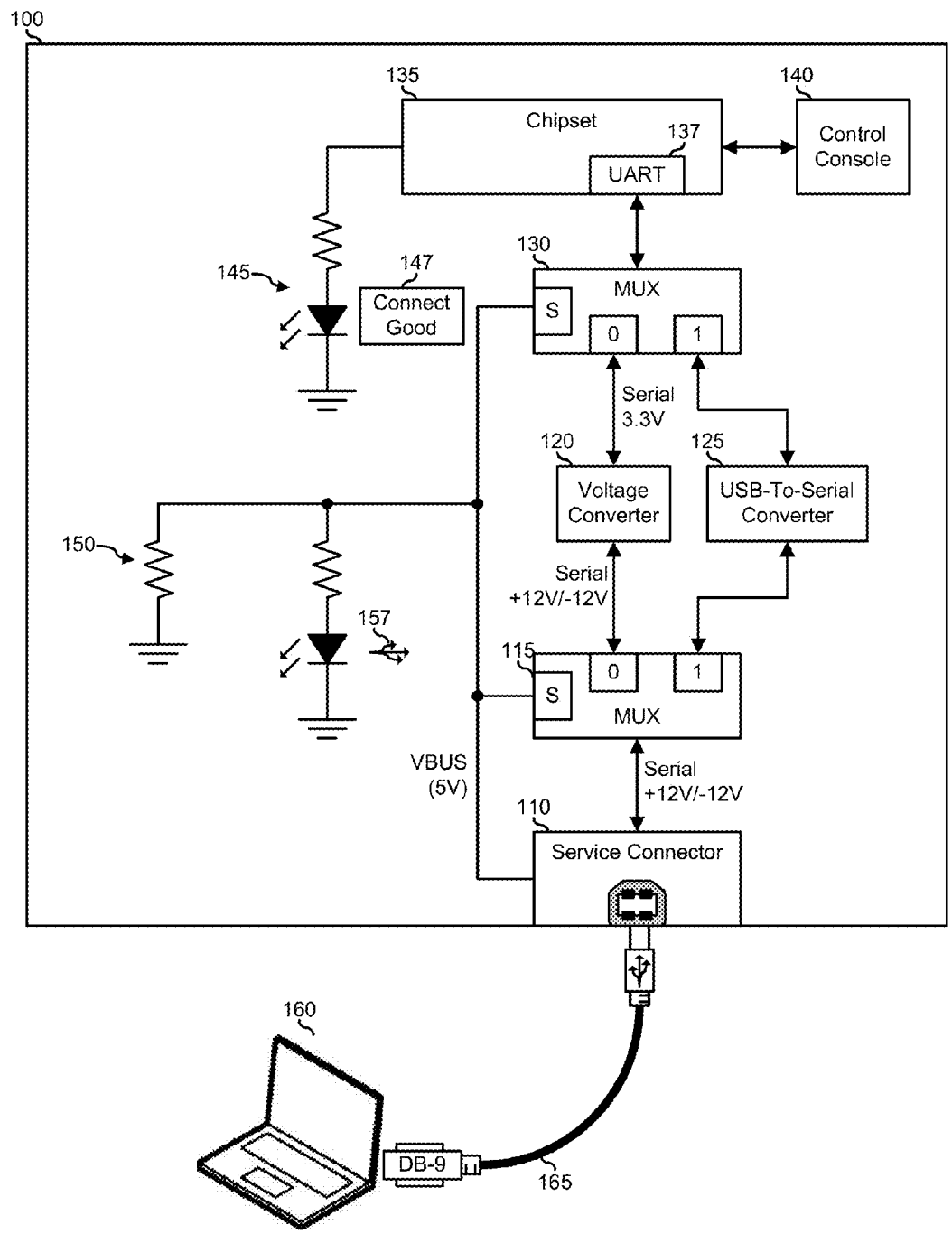
FIGS. 2 and 3 are block diagrams illustrating various use cases for the information handling system of FIG. 1.

FIG. 2 illustrates the operation of information handling system 100 when management system 160 is connected to the information handling system via service cable 165. The DB-9 connector of service cable 165 is connected to management system 160 and the USB type connector is connected to service connector 110. Here, because there is no VBUS (5V) connection equivalent in the DB-9 connection, the selector inputs to multiplexers 115 and 130 are pulled to a low state by pull-down resistor 150, and the multiplexers are each set to their default, port 0 selected, state. Management system 160 communicates a +12V/−12V communication signal to service connector 110, and the signal is provided to the input of multiplexer 115. Because port 0 is selected at multiplexer 115, the signal is routed to voltage converter 120 where the +12V/−12V signal is converted to a 3.3V signal level and because port 0 is selected at multiplexer 130, the converted signal is routed to UART 137. Chipset component 135 detects that UART 137 is receiving the signal and establishes the communication link to control console module 140, and also sets an output to indicator 145. Indicator 145 includes a light emitting diode which illuminates a connection good indication 147 when the communication link between management system 160 and control console module 140 is established. The skilled artisan will recognize that the communication link between management system 160 and control console module 140 is a bidirectional link, and that multiplexers 115 and 130 are therefore bidirectional elements of information handling system 100, and that voltage converter 120 also operates to convert 3.3V signals from UART 137 to +12V/−12V signals to management system 160.

Figure 3:
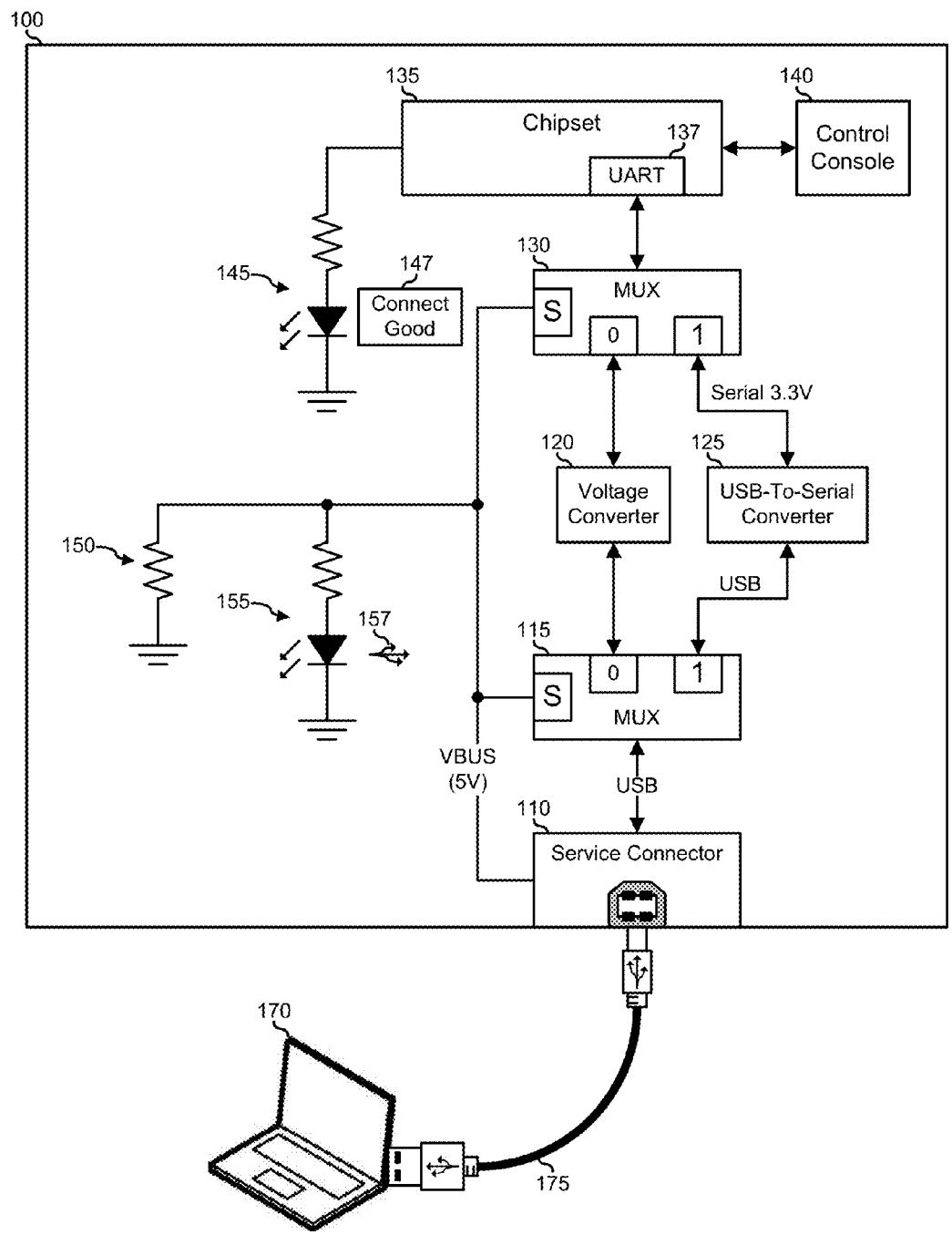

FIG. 3 illustrates the operation of information handling system 100 when management system 170 is connected to the information handling system via service cable 175. One of the USB type connectors of service cable 175 is connected to management system 170 and the other USB type connector is connected to service connector 110. Here the VBUS (5V) connection is present, so the selector inputs to multiplexers 115 and 130 are in a high state, and the multiplexers are each in the port 1 selected state. The presence of the VBUS (5V) voltage also serves to provide power to indicator 155. Indicator 155 includes a light emitting diode which illuminates a USB connection indication 157 when management system 170 is connected to service connector 110. USB connection indication 157 serves as a visual indication that service connector 110 is a service connection that uses a physical USB connector to communicate with control console module 140. Management system 170 communicates a USB communication signal to service connector 110, and the signal is provided to the input of multiplexer 115. Because port 1 is selected at multiplexer 115, the signal is routed to USB-to-Serial protocol converter 125 where the USB signal is converted to a 3.3V signal level and because port 1 is selected at multiplexer 130, the converted signal is routed to UART 137. Chipset component 135 detects that UART 137 is receiving the signal and establishes the communication link to control console module 140, and also sets the output to indicator 145, thereby illuminating connection good indication 147 when the communication link between management system 170 and control console module 140 is established. The skilled artisan will recognize that the communication link between management system 170 and control console module 140 is also a bidirectional link, and that USB-to-Serial protocol converter 125 also operates to convert 3.3V signals from UART 137 to USB signals to management system 170. In a particular embodiment, USB-to-Serial protocol converter 125 is powered using a 5V power plane, and the presence of the VBUS (5V) voltage is also provided to a power connection of the USB-to-Serial protocol converter. In this way, USB-to-Serial protocol converter 125 consumes no power unless management system 170 is connected to information handling system 100.

Figure 4:
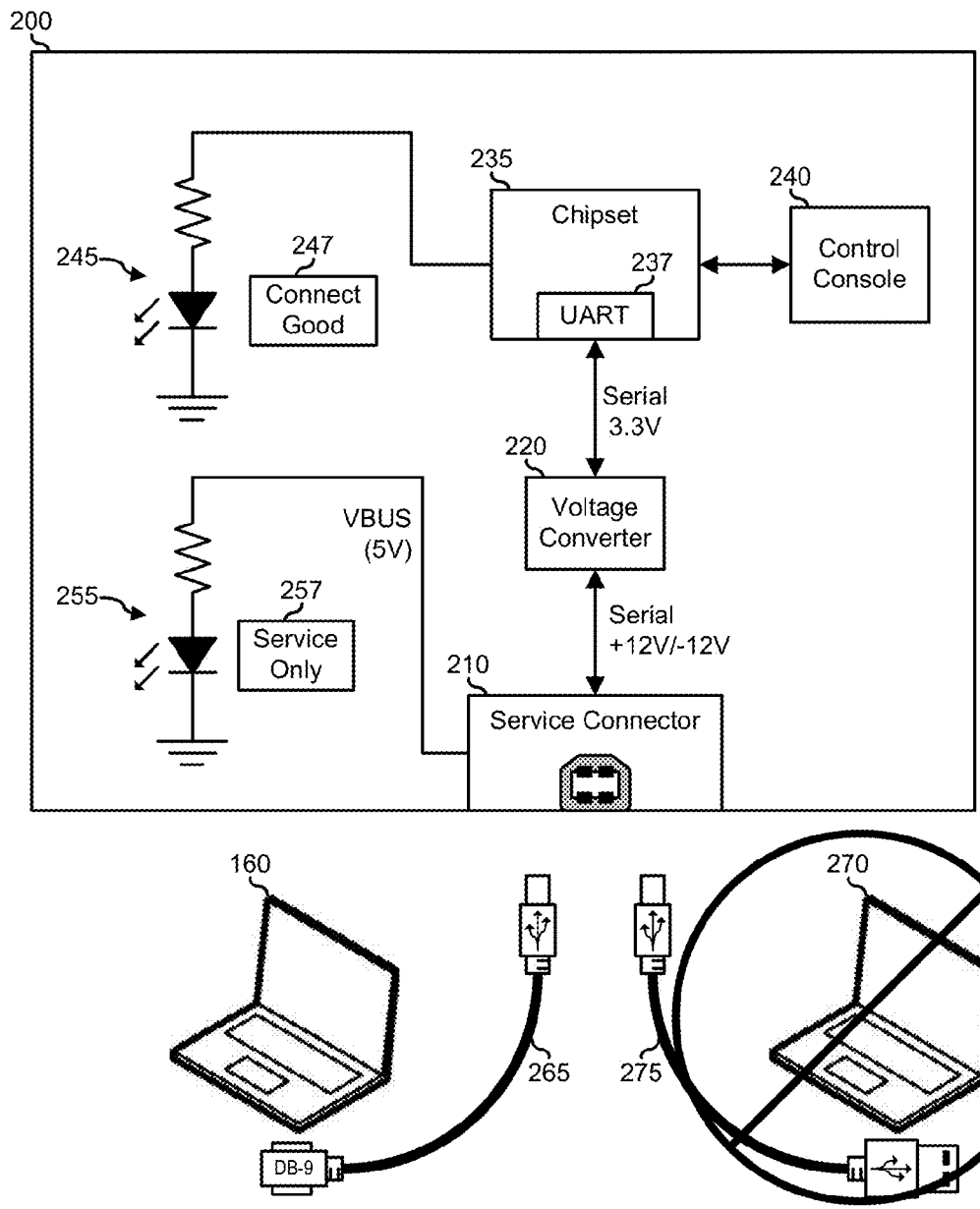
FIG. 4 is a block diagram illustrating an information handling system according to another embodiment of the present disclosure.

FIG. 4 illustrates an embodiment of a managed information handling system 200, similar to information handling system 100, including a service connector 210, a voltage converter 220, a chipset component 235, a control console module 240, and indicators 245 and 255. Service connector 210 is a serial communication connector, and represents a USB connector. The serial communication connections of service connector 210 are connected to a high voltage level port of voltage converter 220, and a low voltage level port of the voltage converter is connected to UART 237 of chipset 235. The VBUS (5V) connection of service connector 210 is connected to indicator 255. Chipset component 235 is connected to control console module 240 and to indicator 245.

Control console module 240 is similar to control console module 140, and operates to provide an interface whereby a system administrator can configure information handling system 200. For example, the system administrator can connect management system 160 to service connector 210 with service cable 165 to access control console module 240. Management system 160 operates to communicate with control console module 240 using the RS-232 serial communication protocol via the DB-9 connector. However, because information handling system 200 lacks multiplexers or a USB-to-serial protocol converter, management system 170 can not be connected to information handling system 200 to access control console module 240. Thus, although service connector 210 is a USB type connector, the service connector does not provide any USB port functionality to information handling system 200. Rather, service connector 110 operates to provide a physical USB connection for translating RS-232 serial communications from management system 260 to a 3.3V serial communications protocol to UART 237, as described below.

Figure 5:
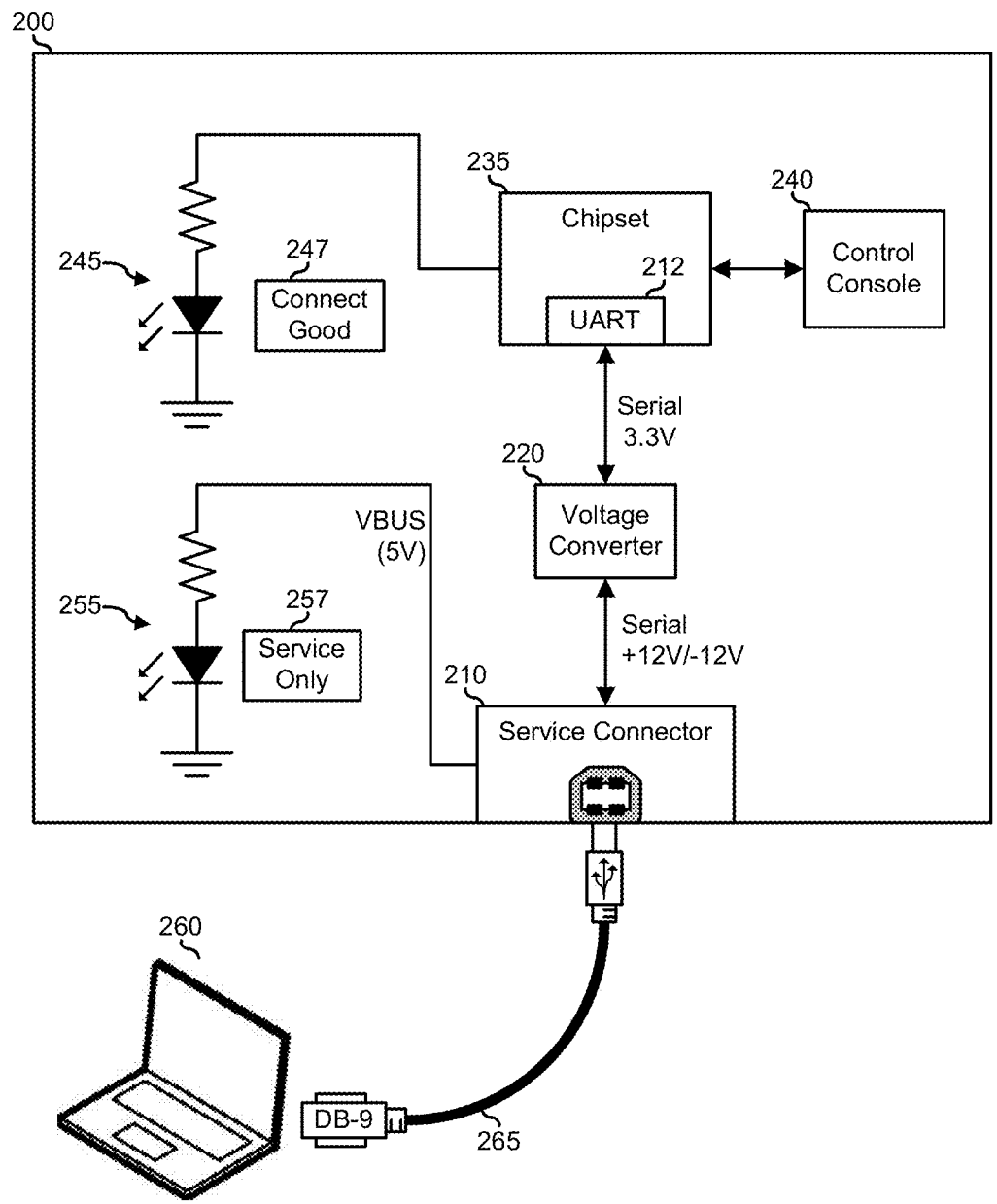
FIGS. 5 and 6 are block diagrams illustrating various use cases for the information handling system of FIG. 4.

FIG. 5 illustrates the operation of information handling system 200 when management system 160 is connected to the information handling system via service cable 165. The DB-9 connector of service cable 165 is connected to management system 160 and the USB type connector is connected to service connector 210. Management system 160 communicates a +12V/−12V communication signal to service connector 210, and the signal is provided to the high voltage level input of voltage converter 220 where the +12V/−12V signal is converted to a 3.3V signal level, and the converted signal is routed to UART 237. Chipset component 235 detects that UART 237 is receiving the signal and establishes the communication link to control console module 240, and also sets an output to indicator 245. Indicator 245 includes a light emitting diode which illuminates a connection good indication 247 when the communication link between management system 160 and control console module 240 is established. The skilled artisan will recognize that the communication link between management system 160 and control console module 240 is a bidirectional link, and that voltage converter 220 also operates to convert 3.3V signals from UART 237 to +12V/−12V signals to management system 160.

Figure 6:
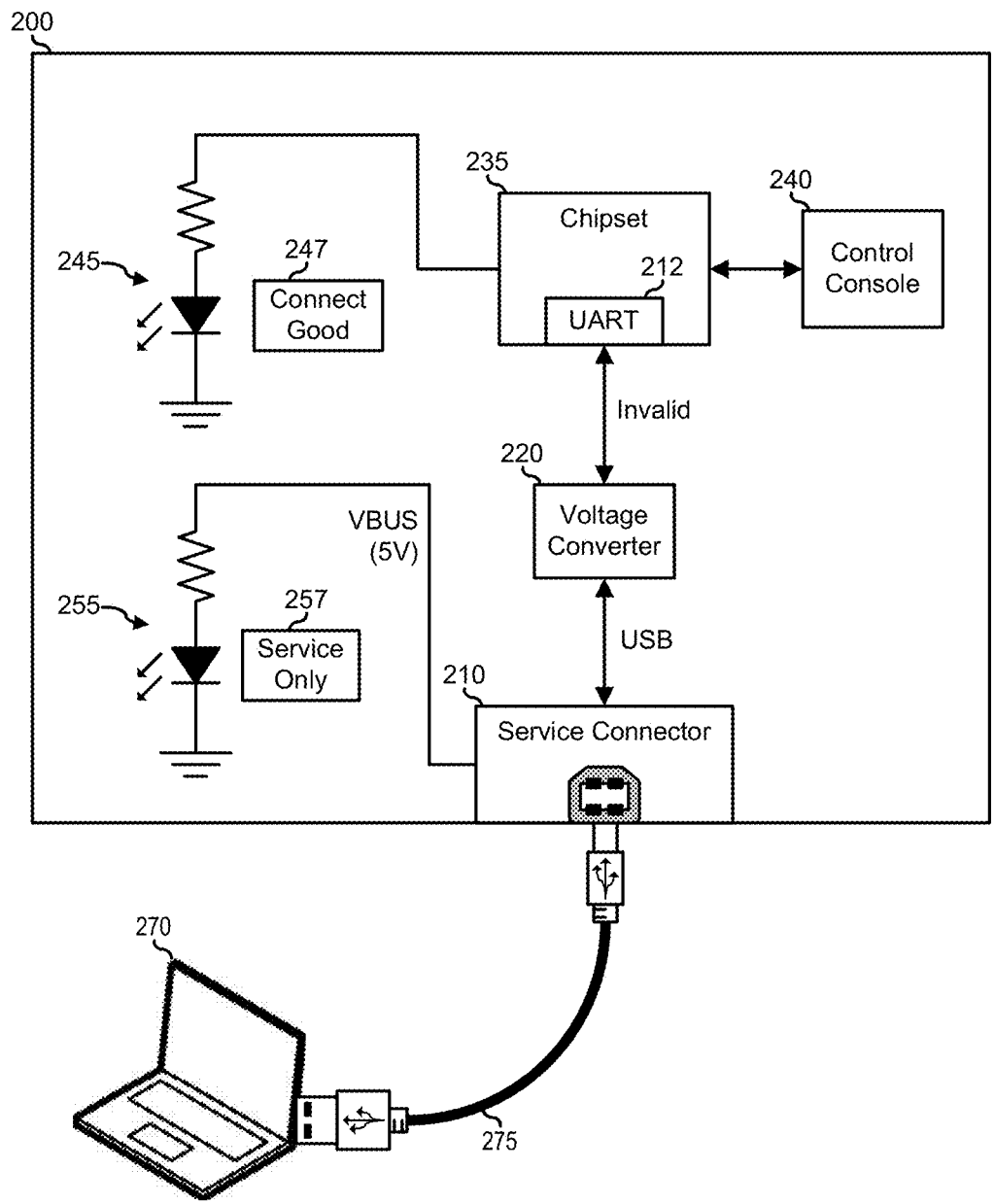

FIG. 6 illustrates the operation of information handling system 200 when an attempt is made to connect management system 170 to the information handling system. One of the USB type connectors of service cable 175 is connected to management system 170 and the other USB type connector is connected to service connector 210. Here the VBUS (5V) connection is present, so the VBUS (5V) voltage is provided to power indicator 255. Indicator 255 includes a light emitting diode which illuminates a no-USB connection indication 257 when management system 170 is connected to service connector 210. No-USB connection indication 257 serves as a visual indication that service connector 210 does not provide any USB port functionality to information handling system 200. Management system 170 communicates a USB communication signal to service connector 210, and the signal is provided to the high voltage level input of voltage converter 220. However, because the USB signal voltage level an RS-232 protocol signal, the low voltage level output of the voltage converter does not provide a valid signal to UART 212, and no connection is made with control console module 240, and indicator 245 is not illuminated.

Figure 7:
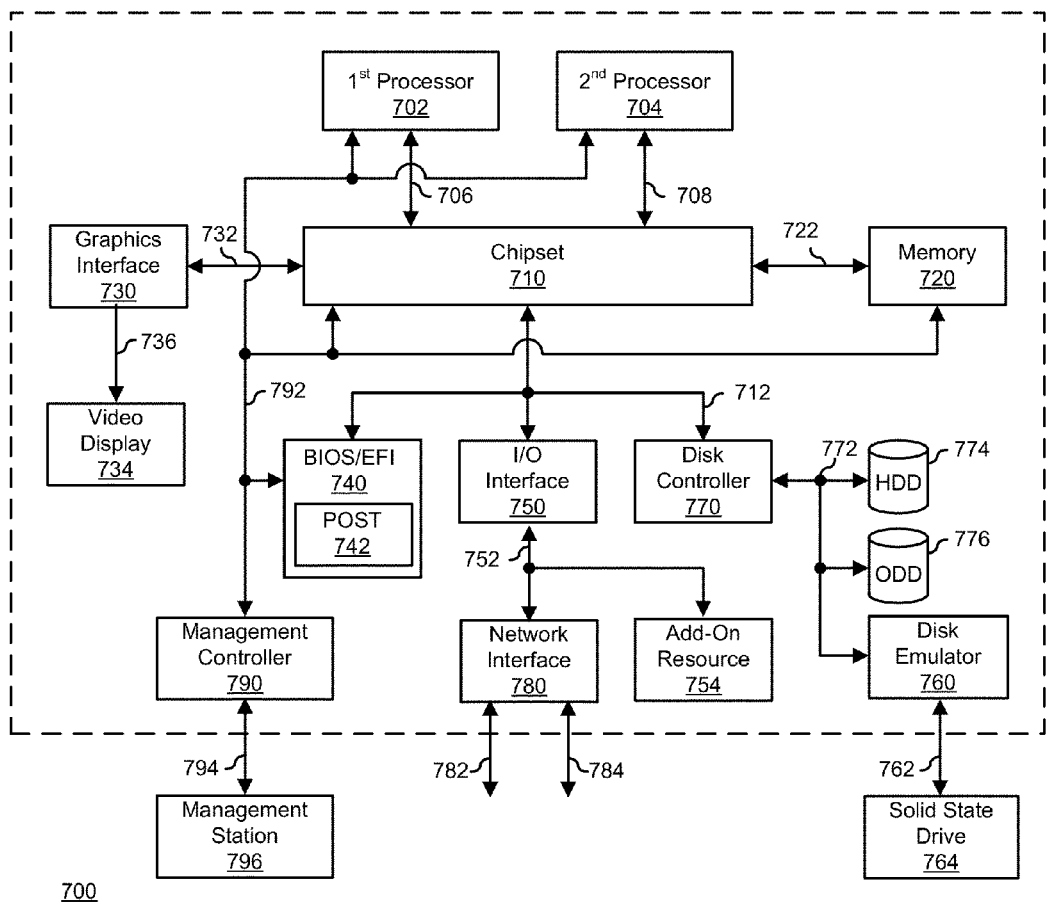
FIG. 7 is a block diagram illustrating an information handling system according to an embodiment of the present disclosure.

FIG. 7 illustrates an information handling system 700 including a processor 702 and one or more additional processors 704, a chipset 710, a memory 720, a graphics interface 730, include a basic input and output system/extensible firmware interface (BIOS/EFI) module 740, a disk controller 750, a disk emulator 760, an input/output (I/O) interface 770, a network interface 780, and a management controller (MC) 790. Processor 702 is connected to chipset 710 via processor interface 706, and processor 704 is connected to the chipset via processor interface 708. Memory 720 is connected to chipset 710 via a memory bus 722. Graphics interface 730 is connected to chipset 710 via a graphics interface 732, and provides a video display output 736 to a video display 734. In a particular embodiment, information handling system 700 includes separate memories that are dedicated to each of processors 702 and 704 via separate memory interfaces. An example of memory 720 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 740, disk controller 750, and I/O interface 770 are connected to chipset 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 710 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 740 includes BIOS/EFI code operable to detect resources within information handling system 700, to provide drivers for the resources, initialize the resources, and access the resources. BIOS/EFI module 740 includes code that operates to detect resources within information handling system 700, to provide drivers for the resources, to initialize the resources, and to access the resources.

Disk controller 750 includes a disk interface 752 that connects the disc controller to a hard disk drive (HDD) 754, to an optical disk drive (ODD) 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits a solid-state drive 764 to be coupled to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O interface 770 includes a peripheral interface 772 that connects the I/O interface to an add-on resource 774 and to network interface 780. Peripheral interface 772 can be the same type of interface as I/O channel 712, or can be a different type of interface. As such, I/O interface 770 extends the capacity of I/O channel 712 when peripheral interface 772 and the I/O channel are of the same type, and the I/O interface translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

In a particular embodiment, add-on resource 774 includes an option ROM (not illustrated). The option ROM is a firmware component supplied by the maker of add-on resource 774 and that operates to initialize and configure the add-on resource 774 during boot of information handling system 700. The option ROM extends the functionality of BIOS/EFI module 740 to incorporate the functionality of add-on resource 774 into information handling system 700. As such, the option ROM provides an interface between BIOS/EFI module 740 and add-on resource 774, permitting the BIOS/

EFI module to implement functions specific to the add-on resource 774, such as power-on self test, interrupt service, or input/output service calls. The option ROM may be in memory 720, or in a memory of add-on resource 774.

Network interface 780 represents a NIC disposed within information handling system 700, on a main circuit board of the information handling system, integrated onto another component such as chipset 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be coupled to external network resources (not illustrated). The network resource can include another information handling system, a data storage system, another network, a grid management system, another suitable resource, or a combination thereof.

MC 790 is connected to processors 702 and 704, chipset 710, memory 720, and BIOS/EFI module 740 via a system communication bus 792. MC 790 may be on a main circuit board such as a baseboard, a motherboard, or a combination thereof), integrated onto another component such as chipset 710, in another suitable location, or a combination thereof. In a particular embodiment, one or more additional resources of information handling system 700, such as graphics interface 730, video display 734, I/O interface 770, disk controller 750, and network interface 780 are connected to MC 790. MC 790 can be part of an integrated circuit or a chip set within information handling system 700, and can be on a main circuit board, on separate circuit board or add-in card disposed within the information handling system, or a combination thereof. An example of MC 790 includes a baseboard management controller (BMC), an integrated Dell remote access controller (iDRAC), another controller, or a combination thereof. An example of system communication bus 792 includes an inter-integrated circuit (I²C) bus, a system management bus (SMBus), a serial peripheral interface (SPI) bus, a low pin count (LPC) bus, another bus, or a combination thereof.

MC 790 is connected via a network channel 794 to a management station 796 that is external to information handling system 700. Management station 796 operates in conjunction with management controller 790 to provide out-of-band management of information handling system 700. Commands, communications, or other signals are communicated between MC 790 and management station 796 to monitor status of information handling system 700, to control the operations of the resources of the information handling system, and to update the resources. In a particular embodiment, MC 790 is powered by a separate power plane in information handling system 700, so that the MC can be operated while other portions of the information handling system are powered off. In another embodiment, MC 790 is operated during boot of information handling system 700.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a service connector operable to receive an RS-232 signal and a Universal Serial Bus (USB) signal, wherein the service connector comprises a USB type connector;
   a voltage converter operable to convert the RS-232 signal from a first voltage level to a first serial signal at a second voltage level when a signal received by the service connector is the RS-232 signal;
   a protocol converter operable to convert the USB signal to a second serial signal at the second voltage level when the signal received by the service connector is the USB signal; and
   a universal asynchronous receiver/transmitter (UART) operable to receive the first serial signal and the second serial signal.

2. The information handling system of claim 1, further comprising:
   a first multiplexer operable to provide the RS-232 signal to the voltage converter when the signal received by the service connector is the RS-232 signal, and to provide the USB signal to the protocol converter when the signal received by the service connector is the USB signal; and
   a second multiplexer operable to provide the first serial signal to the UART when the signal received by the service connector is the RS-232 signal, and to provide the second serial signal to the UART when the signal received by the service connector is the USB signal.

3. The information handling system of claim 2, wherein the first multiplexer and the second multiplexer are in a default state when the signal received by the service connector is the RS-232 signal, and are in a selected state when the signal received by the service connector is the USB signal.

4. The information handling system of claim 3, wherein:
   the selection of the default state of the first multiplexer and the second multiplexer is based upon the absence of a voltage on a VBUS pin of the service connector when a USB connector is connected to the service connector; and
   the selection of the selected state of the first multiplexer and the second multiplexer is based upon the presence of the voltage on the VBUS pin of the service connector when the USB connector is connected to the service connector.

5. The information handling system of claim 4, further comprising:
   an indicator that is unlit when the voltage is absent, and is lit when the voltage is present.

6. The information handling system of claim 5, wherein the indicator provides an indication that the service connector is not a standard USB connection when the indicator is lit.

7. The information handling system of claim 1, further comprising:
   a chipset component that includes the UART: and
   a control console module connected to the chipset component, and operable to communicate with a management system via the service connector.

8. The information handling system of claim 1, further comprising:
   an indicator that is unlit when the UART does not receive the first serial signal and the second serial signal and that is lit when the UART receives the first serial signal or the second serial signal.

9. A method comprising:
   receiving, at a service connector of an information handling system, a first signal, wherein the service connector comprises a Universal Serial Bus (USB) type connector;
   determining that the first signal is an RS-232 signal;
   in response to determining that the first signal is an RS-232 signal:
      providing the RS-232 signal to a voltage converter operable to convert the RS-232 signal from a first voltage level to a second signal at a second voltage level; and
      providing the second signal to a universal asynchronous receiver/transmitter (UART); and
   in response to determining that the first signal is a USB signal:
      providing the USB signal to a protocol converter operable to convert the USB signal to a third signal at the second voltage level; and
      providing the third signal to the UART.

10. The method of claim 9, further comprising:
   in further response to determining that the first signal is the RS-232 signal:
      providing the RS-232 signal to the voltage converter via a first port of a first multiplexer; and
      providing the second signal to the UART via a first port of a second multiplexer; and
   in further response to determining that the first signal is the USB signal:
      providing the USB signal to the voltage converter via a second port of the first multiplexer; and
      providing the third signal to the UART via a second port of the second multiplexer.

11. The method of claim 10, further comprising:
   setting the first multiplexer and the second multiplexer into a default state in further response to determining that the first signal is the RS-232 signal; and
   setting the first multiplexer and the second multiplexer into a selected state in further response to determining that the first signal is the USB signal.

12. The method of claim 11, wherein:
   determining that a VBUS pin of the service connector does not provide a voltage level;
   selecting of the default state of the first multiplexer and the second multiplexer in response to determining that the VBUS pin does not provide the voltage level;
   determining that the VBUS pin provides the voltage level; and
   selecting of the selected state of the first multiplexer and the second multiplexer in response to determining that the VBUS pin provides the voltage level.

13. The method of claim 12, further comprising:
   providing an indication when the VBUS pin provides the voltage level.

14. The method of claim 13, wherein the indicator provides an indication that the service connector is not a standard USB connection when the indication is provided.

15. The method of claim 9, further comprising:
   providing, from the UART, the second signal and the third signal to a control console module of the information handling system; and
   communicating between the control console module and a management system via the service connector.

16. The method of claim 9, further comprising:
   providing an indication when the UART receives the second signal or the third signal.

17. An information handling system comprising:
   a service connector operable to receive an RS-232 signal and a Universal Serial Bus (USB) signal, wherein the service connector comprises a USB type connector;
   a voltage converter operable to convert the RS-232 signal from a first voltage level to a serial signal at a second voltage level when a signal received by the service connector is the RS-232 signal;
   a universal asynchronous receiver/transmitter (UART) operable to receive the serial signal; and
   an indicator that is unlit when a VBUS pin of the service connector does not provide a voltage level and that is lit when the VBUS pin provides the voltage level.

18. The information handling system of claim 17, wherein the indicator provides an indication that the service connector is not a standard USB connection when the indicator is lit.

19. The information handling system of claim 17, further comprising:
   a chipset component that includes the UART: and
   a control console module connected to the chipset component, and operable to communicate with a management system via the service connector.

20. The information handling system of claim 17, further comprising:
   an indicator that is unlit when the UART does not receive the serial signal and that is lit when the UART receives the serial signal.

* * * * *